US011655988B1

(12) United States Patent
Rodriguez et al.

(10) Patent No.: US 11,655,988 B1
(45) Date of Patent: May 23, 2023

(54) LOW COST, RUGGED, LIGHTWEIGHT ENVIRONMENTAL CONTROL UNIT

(71) Applicant: Mainstream Engineering Corporation, Rockledge, FL (US)

(72) Inventors: Christian O. Rodriguez, Melbourne, FL (US); Andrew L. Carpenter, Rockledge, FL (US); Robert P. Scaringe, Indialantic, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 17/508,172

(22) Filed: Oct. 22, 2021

Related U.S. Application Data

(62) Division of application No. 16/851,154, filed on Apr. 17, 2020, now Pat. No. 11,226,118.

(51) Int. Cl.
| | |
|---|---|
| *F24F 1/04* | (2011.01) |
| *F24F 1/029* | (2019.01) |
| *A47B 47/04* | (2006.01) |
| *B29K 101/12* | (2006.01) |
| *B29C 41/04* | (2006.01) |

(52) U.S. Cl.
CPC .............. *F24F 1/04* (2013.01); *A47B 47/047* (2013.01); *F24F 1/029* (2019.02); *B29C 41/04* (2013.01); *B29K 2101/12* (2013.01)

(58) Field of Classification Search
CPC ........ B29C 41/04; B29K 2101/12; F24F 1/04; A47B 47/047
See application file for complete search history.

(56) References Cited

U.S. PATENT DOCUMENTS

| | | | |
|---|---|---|---|
| 5,943,873 A | 8/1999 | Chung | |
| 6,149,228 A | 11/2000 | O'Neill et al. | |
| 6,199,388 B1* | 3/2001 | Fischer, Jr. ............... | F24D 5/04 62/271 |
| 9,150,295 B2 | 10/2015 | West et al. | |
| 9,370,882 B2 | 6/2016 | Giddons et al. | |
| 9,526,332 B1 | 12/2016 | Feinstein et al. | |
| 10,207,606 B2 | 2/2019 | Roberts | |
| 10,252,450 B2 | 4/2019 | Zhang et al. | |
| 10,357,109 B2 | 7/2019 | Nose | |
| 2002/0170161 A1* | 11/2002 | Cadle ........................ | F16C 9/02 29/888.09 |
| 2005/0254975 A1* | 11/2005 | Kinmartin .......... | B60H 1/00471 417/313 |
| 2006/0237873 A1* | 10/2006 | Reinders ................. | F24F 13/20 62/304 |

(Continued)

*Primary Examiner* — Schyler S Sanks
(74) *Attorney, Agent, or Firm* — Michael W. O'Neill, Esq.

(57) ABSTRACT

An air conditioning apparatus for cooling and/or dehumidifying an interior space, such as the interior of a shelter or tent that provides for simplified manufacturing, simplified inspection and servicing, reduced noise, reduced vibration, reduced weight, increased ruggedness and health monitoring. Structural components of the apparatus are fabricated from foam-filled molded parts with interlocking components, and the unit is assembled and tested without any outside cover, but once the cover is installed, additional structural strength is obtained from the cover. A refrigerant flow sensor along with other sensors are used to determine actual real time cooling capacity measurements and health monitoring.

1 Claim, 7 Drawing Sheets

(56) References Cited

U.S. PATENT DOCUMENTS

| | | | |
|---|---|---|---|
| 2009/0139245 A1 | 6/2009 | Blackway et al. | |
| 2010/0154447 A1* | 6/2010 | Yoshimi | F25B 49/005 62/149 |
| 2013/0327497 A1* | 12/2013 | Genung | F16L 1/032 62/238.7 |
| 2014/0150488 A1* | 6/2014 | Black | F24F 3/14 29/890.035 |

* cited by examiner

LOW COST, RUGGED, LIGHTWEIGHT ENVIRONMENTAL CONTROL UNIT

This application is a divisional of U.S. patent application Ser. No. 16/851,154, filed on Apr. 17, 2020, now U.S. Pat. No. 11,226,118, which is incorporated by reference herein in its entirety.

BACKGROUND

The present invention reduces the cost of manufacturing an environmental control unit (ECU), simplifies the inspection and servicing of the unit, reduces the weight, and increases the ruggedness of the unit. Particularly, the present invention is concerned with replacing conventional sheet metal, extruded, forged, and punched parts with a lighter weight, more durable mechanical configuration, that will also simplify inspection, simplify assembly/disassembly, and reduce fabrication expenses. Furthermore, the present invention contemplates fabrication of the ECU utilizing a rotomolding process of manufacturing and the rotomolded filled structural components will also dampen vibration and reduce acoustical noise.

This invention consists of an improvement of vapor compression environmental control unit, or ECU, also referred to in the professional trades as an air conditioner or heat pump for cooling/heating and/or dehumidifying an interior space, such as a building interior or interior of a shelter or tent for example. The improvements to legacy design includes simplified manufacturing, simplified inspection and servicing, reduced noise and vibration, reduced weight, and increased ruggedness of the unit. These benefits are achieved by incorporating rotationally molded interlocking structures to support the critical items of the ECU assembly including the compressor, condenser, and evaporator as well as the fan and blower motor assembly. In one preferred embodiment of the invention, the rotomolded structure is strengthened and insulated (thermal and noise) by filling the interior void of the rotationally molded structure with a closed cell or open cell foam. In an alternate embodiment, to provide strength while also providing anchoring weight, the interior of the rotomolded base structure could alternatively be filled with water, or some other dense fluid, to provide ballast and strength, and this fluid can be drained if the unit is to be moved. Our currently preferred embodiment, is to use closed cell foam for increased structural rigidity and vibration damping while also providing thermal and acoustic insulation with minimal impact on weight.

Rotational molding or rotomolding, as it is referred to in the trade, is a well-known method to form hollow structures. As understood in the trade, rotational molding is a molding process that involves a heated hollow mold which is filled with a charge or shot weight of material. The mold is then slowly rotated, causing the softened material to disperse and stick to the walls of the mold. Of course, it should be understood that any molding or fabrication process which forms an interior void that can be filled with a structural stiffening filler, insulating foam or ballast, such as blow molding, can be substituted for the rotomolding process.

The following prior art appears material to the invention described herein.

U.S. Pat. No. 9,370,882 B2 to Giddons et al. discloses a cost effective and efficient air circulation system for a rotomolded vehicle body. According to the disclosure, the principal object of the invention is to provide a cost effective and efficient air circulation system. The inventors discuss creating an air flow pathway by the rotomolding process to generate a cavity in the wall of the body of the vehicle for cooling. In this disclosure, the inventors are seeking to use a portion of the hollow space formed by rotomolding to create air distribution ductwork. From col. 5, ll. 1-6, the inventors have realized that the rotomolding sections can include foam layers in the cavity formed by the inner and outer solid plastic skins, however they intentionally formed such foam filled volumes to "leave a continuous air filled cavity within and throughout the body walls." Unlike this approach, our preferred embodiment uses a completely foam filled core, that can be bonded to the interior molded surfaces, to increase the stiffness, strength, and damping characteristics of the rotomolded component.

U.S. Pat. No. 9,150,295 B2 to West et al. discloses a modular personal watercraft where the modular components are fabricated by (col. 3, ll. 66-67 and col. 4, l. 1) blow molding, injection molding, and rotomolding. The inventors do highlight the cost savings of using molding processes and realized that (col. 2, ll. 60-62) the individual components could be connected by "interlocking channels and/or dovetail joints." In spite of this being a boat, no mention of filling the interior void of the rotomolded parts with a closed cell foam are discussed for either flotation or structural benefits.

U.S. Pat. No. 9,526,332 B1 to Feinstein et al. describes a system of modular components used to build structures that are easily assembled and disassembled. This modular system can be "partially or fully constructed at a factory by rotomolding (col 2, ll. 55-56). Likewise U.S. Pat. No. 6,149,228 to O'Neill et al. discloses a Modular Operator Enclosure assembled from modular components and U.S. Pat. No. 10,357,109 B2 to Nose discloses the manufacture of upholstered modular furniture formed by a plurality of modular components substantially composed of a polymeric material.

There is also prior art referring to methods to increase the structural strength of molded parts. U.S. Pat. No. 10,252,450 B2 to Zhang et al. discloses a reinforced thermoplastic product that may include a main body and a fabric reinforcing sheet that is disposed within a wall of the main body. Alternatively, U.S. Pat. No. 10,207,606 B2 to Roberts discloses an in-situ molded foam core structural plastic article having an outer shell with an interior cavity filled with expandable polymer beads which when expanded substantially fill the interior cavity forming a thermal bond with the shell. The bead and shell are of a similar plastic composition, allowing a thermal bond to be formed by heating. In our configuration, the interior fill material is not comprised of beads but instead an expanding open or closed cell foam, which will more completely fill the interior without any void space and will bond to the mold material as it cures. The foam is of course not the same material as the external molded material.

While it is clear that the prior art understood that the use of molded plastic parts could reduce manufacturing costs, and reduce weight, it is also clear that the additional benefits of using interlocking foam filled rotomolded parts to reduce vibration, reduce acoustical noise and provide damping of the structure was never realized. Likewise, the applicability of interlocking rotomolded parts for the manufacture of ruggedized ECUs has not been anticipated in the prior art. Finally, rotomolding allows depressions, indentations, or position locating surface features to be easily accommodated into the mold, making the rapid and failsafe (only fits one way due to the depression, indentation, or surface feature) locating of components being assembled onto the rotomolded part. While the use of threaded inserts, to accept bolted parts and dovetailed attachment means (or the like) are used commonly, these attachment means can be used along with the parts locating features molded into the part, to make assembly of components onto the rotomolded part fast and failsafe.

For the foregoing reasons, there is a need for an improved ECU design that incorporates the benefits of rotomolding to reduce the cost of manufacturing, improve the ruggedness of the design, simplify maintenance and repair, and reduce vibration and noise when the ECU is operating. Reduce vibration will also lower the fatigue on refrigerant plumbing assemblies, thereby increasing reliability and life.

SUMMARY

The most basic implementation of this invention, consists of a rotomolded base, which has threaded inserts to allow direct bolting of the compressor, condenser, evaporator, fan motor, and other components where the base has been contoured to allow a portion of the compressor, condenser, evaporator, fan motor, and other components to be recessed into the base so as to provide additional structural support and facilitate correct and rapid location of these components. The condensate drain pan, which is used to capture condensate dripping from the evaporator coil, can be integrated directly into the rotomolded base, and condensate drain plumbing which is used to channel the condensate out of the ECU (as well as any electrical wiring) can be routed through the interior of the rotomolded components, such as the base, prior to filling the interior void of the base with foam (the foam providing increased structural strength and insulation).

In addition to the rotomolded base there is a rotomolded divider, which separates the evaporator and condenser sections of the ECU. This rotomolded divider is also filled with expanding foam (open or closed cell) to provide thermal insulation between the cooler evaporative section and the warmer condenser section. In our invention, wherever the foam is used to fill the void in the rotomolded part, this foam also increases the structural rigidity while also providing vibration and noise dampening characteristics to the molded part. This is ideal because, in the case of the divider, the divider can now be used to effectively support the double-ended fan motor where the motor shaft of the motor extends into both the evaporator and condenser sides of the ECU, allowing this single motor to drive both the condenser fan and evaporative blower (the term blower can also referred to as a fan). Since the motor driving both the condenser and evaporator fan blades is supported by the divider and all other vapor compression components have been located on, or supported by either the base or the divider, this means the entire vapor compression fluid and electrical circuit has been completely installed and can be connected, without the sides and top of the unit, thereby making assembly, inspection and performance testing simplified, due to the accessibility to the components. This also means a unitary cover can be rotomolded as a single piece which can then be installed into the base, quickly and easily, by providing mating male and female components which align and support the components and threaded inserts to complete the installation. The cover can contain recesses or slots or protrusions to accommodate the divider, the compressor, the evaporator coil, and condenser coil, thereby providing additional structural strength to the divider assembly and the installed components.

To provide improved structural strength the divider has a tapered male or female portion which extends into the similarly shaped female or male section in the base (and the cover) so that as the threaded inserts (in the divider, base, or cover) which align with threaded bolts in the other component tighten they draw the male and female components into a tight interference fit, providing a strong joint.

A fan or blower motor assembly is necessary to provide outdoor ambient airflow through the condenser coil (in cooling mode) and a second fan or blower motor assembly is necessary to force interior conditioned air through the evaporator (in cooling mode) to provide cooling and dehumidification of the conditioned air space. For ECUs which are typically larger cooling units greater than 2 tons of cooling range (greater than 24,000 BTU/hr) two separate motors for the condenser and evaporator air flow are typically used. However, for smaller window air conditioners it is not uncommon for a single motor, which is correspondingly lighter and smaller and therefore easier to support, with a double shaft to be used to produce the separate air flows across both coils (evaporator and condenser). The size and therefore the structural requirements to support a single motor for both air flows has traditionally limited the use of a single motor, to these smaller units (under approximately 2 tons of cooling). However, with the innovative rotomolded configuration disclosed herein, the dramatically improved structural strength and inherent vibration damping characteristics, along with the broad mounting surface, as a result of the thickness of the foam cored rotomolded divider, make the use of a single motor practical for this application, thereby reducing cost and simplifying maintenance and repair.

Since a single motor is being used to drive both the evaporator blower and condenser fan, there is naturally some loss in operational flexibility, since in a more traditional configuration, the evaporator fan speed and condenser motor speed could be varied independently to adjust the heat exchange across the evaporator or condenser. That is to reduce the heat transfer, and thereby reduce the energy transfer, the fan or blower speed could be reduced. To accommodate this feature without the luxury of separate variable speed motors to separately control the condenser air flow and the evaporator air flow, bypass lines with electrically activated valves are used. In the currently preferred embodiment, the electrically activated valves are solenoid valves. One by-pass line, containing an electrically activated valve, is located in a parallel flow path with the condenser coil, and a second bypass line, containing an electrically activated valve, is located in a parallel flow path with the evaporator coil. In such a configuration, opening the electrically activated valve would allow some refrigerant to avoid passing through the heat exchanger (which is in the parallel flow arrangement when the electrically activated valve is open), thereby lowering the heat transfer and the energy transported across the heat exchanger. Since a solenoid valve can be repeatedly activated as quickly or a slowly as desired, any heat transfer reduction, that is any quantity of refrigerant bypassing the heat exchanger, can be easily adjusted by altering the time the solenoid valve is operated ranging from essentially complete heat exchanger bypass when the solenoid valve is opened for extremely long periods to no bypass if the solenoid valve is not opened. It should be noted that a solenoid in each parallel flow path or a bi-directional valve or a diverter valve could be used to bypass the refrigerant flow around the heat exchanger, however, since the pressure drop of the bypass line is far less than the pressure drop through the heat exchanger, only a single bypass solenoid valve is needed, since when opened the far lower pressure drop will assure that a majority of the refrigerant will flow through the open bypass.

The entire refrigeration circuit for the ECU along with all controls, sensors, and wiring are located on the base and dividing wall between the hot and cold sections. In this way the cover for the ECU can be rotomolded from a single piece and installed last, after the refrigerant circuit, all hardware and all wiring has been assembled, leak checked, and the overall operation of the ECU confirmed. This allows access to all sides of the ECU. The cover would also contain molded supports for further securing the compressor, evaporator, condenser, air filters, mist eliminator, and other peripheral components. These additional supports molded into the cover would provide additional structural support, as well as confirmation of proper alignment of these components.

On conventional ECUs, the flexible air ducts that are connected to the inlet and outlet of the blower assembly are typically removed when not in use and this is a time-consuming and/or awkward operation since the air ducts must be well connected without any leakage paths. In this configuration the cover can have a recessed section to accommodate the storage of the flexible ducts while they stay connected to the inlet and outlet airflow connections. This removes the need for a costly and relatively heavy and expensive ductwork flange. Alternatively, a molded flange could be incorporated into the cover housing so that the air ducts could be slid over the flange and secured with a band, belt, or hook and loop strip, as a means of securing, for example.

Radial and axial fans that would be used in this ECU, typically have air flow management surfaces to maximize the performance of these devices. With this rotomolded configuration, these sometimes complex three-dimensional surfaces can be incorporated into the rotomolded design to reduce assembly time and reduce cost. Airflow passageways can likewise be molded into the cover and other components to optimize air flow and minimize abrupt changes and sharp turns which tend to increase pressure drop losses.

To assist in stacking ECUs for shipment, male and female interlocking sections can be incorporated into the base and cover, to allow the ECUs to be interlocked when stacked.

The rotomolded surfaces can also have recesses molded into the structure to accommodate wiring, cable management, and plumbing runs. Furthermore, if desired, electrical busbars or other forms of electrical wiring, can be located in the interior of the rotomolded structures prior to filling these void spaces with foam insulation.

The disclosed invention is an improvement to state of the ECU art because of the increase in ruggedness, while also decreasing the manufacturing cost, parts count, assembly, and repair time.

An object of this invention is to provide an ECU with a rotomolded base that incorporates threaded inserts to allow direct bolting of the compressor, condenser, evaporator, and other components where the base has been contoured to allow a portion of the compressor, condenser, evaporator, and other components to be recessed into the base so as to provide additional structural support and facilitate correct and rapid location of these components.

A further object of this invention is to integrate the condensate drain pan directly into the rotomolded base, and also the condensate drain plumbing which is used to channel the condensate out of the ECU (as well as any electrical wiring) can be routed through the interior of the rotomolded components, such as the base, prior to filling the interior void of the base with foam.

Another further object of this invention is to utilized a foam filled rotomolded divider, which separates the evaporative and condenser sections of the ECU and uses the foam filled divider to provide thermal insulation between the cooler evaporative section and the warmer condenser section.

Another further object of this invention is to use the foam filled rotomolded divider to increase the structural rigidity and vibration and noise dampening characteristics of the divider, since the motor driving both the evaporator blower and condenser fan blades is mounted to this divider.

Another further object of this invention is to configure the system so that the entire vapor compression fluid circuit can be installed, connected, leak tested, and operated without the cover on the unit, where the cover consists of the four sides and top of the unit.

Another further object of this invention is to utilize a single unitary rotomolded cover which can then be installed onto the base as the last step in the assembly process and utilizing mating male and female components which align and support the components and threaded inserts, adhesive or embedded magnetic materials to complete the installation.

Another further object of this invention is to utilize recesses or slots in the cover and base to accommodate the divider, thereby providing additional structural strength to the divider assembly.

Another further object of this invention is to utilize tapered male or female portion on the ends of the divider which extend into the similarly shaped female or male section in the base and the cover so that as the threaded connections are tightened they draw the male and female components into a tight interference fit, providing a strong joint.

Another further object of this invention is to increase one or more of the structural strength, vibration dampening, noise dampening, and thermal insulation by filling the internal void of the rotomolded components with an expanding foam or other structural or thermal material that fills the void space in the core of the molded part.

Another further object of this invention is to utilize solenoid-valve bypass lines to independently modulate the heat transfer across the evaporator heat exchanger coil and condenser heat exchanger coil.

Another further object of this invention is to utilize a unitary ECU cover, rotomolded as a single piece and installed last, after the refrigerant circuit has been assembled and leak checked and the overall operation of the ECU confirmed.

Another further object of this invention is to utilize supports molded into the rotomolded components for additional securing of the refrigerant circuit components, including the evaporator, condenser, compressor, suction line accumulator, liquid receiver, electrical control box, plumbing lines, electrical lines, air filter, and mist eliminator.

Another further object of this invention is to provide a recessed section of the cover to accommodate the storage of the flexible ducts, allowing them to remain connected to the inlet and outlet blower connections.

Another further object of this invention is to rotomold any necessary complex three-dimensional airflow surfaces into the rotomolded cover or other components to reduce assembly time, improve airflow, and reduce cost.

Another further object of this invention is to rotomold any electrical control or junction box into the rotomolded base or divider or other components to reduce assembly time, reduce parts count, save space, and reduce cost.

Another further object of this invention is to utilize male and female interlocking sections in the base and cover to assist in stacking ECUs for shipment.

Another further object of this invention is to provide recesses molded into the structure to accommodate wiring, electrical cable management, and plumbing runs.

Another further object of this invention is to locate electrical busbars and other forms of electrical wiring in the interior of the rotomolded structures prior to filling these void spaces with foam insulation.

Another further object of this invention is to provide an ECU with the ability to provide automatic health monitoring and alert the user of problems with the unit and degrading performance, before the system fails completely.

The present invention improves on the known variations of conventional ECUs by reducing assembly cost and time, improving ruggedness, improving maintainability, and reducing vibration and noise. The present invention also has the ability to detect and identify operational problems, before a complete system failure occurs.

BRIEF DESCRIPTION OF THE DRAWINGS

These and other features, aspects, and advantages of the present invention will become better understood with regard to the following description, appended claims, and accompanying drawings where:

DESCRIPTION

In the Summary above and the Description, and the claims below, and in the accompany drawings, reference is made to particular features (including method steps) of the invention. It is to be understood that the disclosure of the invention in this specification includes all possible combinations of such particular features. For example, where a particular aspect or embodiment of the invention, or a particular claim, that feature can also be used, to the extent possible, in combination with and/or in the context of the other particular aspects and embodiments of the invention, and in the invention generally.

Environmental control units (ECUs) or air conditioners are used to provide shelter-cooling for military applications as well as civilian operations were non-permanent structures such as tents are used to provide living quarters or work spaces. These ECUs must accommodate rough handling while they are being transported to these out of the way locations. They also must be very reliable, since repair resources are generally not available. They must also be easy to service, since they are typically not being serviced by air conditioning professionals but rather by field mechanics that are required to support many different pieces of field equipment, without specialized training in any one technology area. It would also be of tremendous value if the ECU could identify problems with the hardware (such as loss of refrigerant charge, and reduced air flow for example) or maintenance requirements (such as coil cleaning or filter cleaning) before the issues become so significant as to cause a complete loss of cooling by the unit.

Traditional ECUs are essentially made in a manner very similar to the air conditioner units used in homes and business, where a sheet metal enclosure surrounds the air conditioner components, and this housing is secured with self-taping sheet metal screws or machine screws. One or more of the side panels or top panel must be removed to access the interior, and as a minimum these panels support some components, such as the condenser fan, making access to the interior of the ECU cumbersome. These panels are also thin sheet metal to reduce cost and weight and therefore are easily damaged or dented. These panels must also be fabricated from a non-corrosive material or painted (or treated in some fashion) for both aesthetics and to reduce corrosions, which tends to increase cost of the unit. These units also have no active health monitoring, so that maintenance is performed on a timed basis instead on an as needed basis (resulting in unnecessary maintenance or insufficient maintenance, depending on conditions, including sand and dust conditions) and there is no indication of degraded performance until the unit completely fails to provide any cooling.

To address these and other common issues, we have developed this improved ruggedized ECU with automatic health monitoring and fault prediction.

Figure 1:
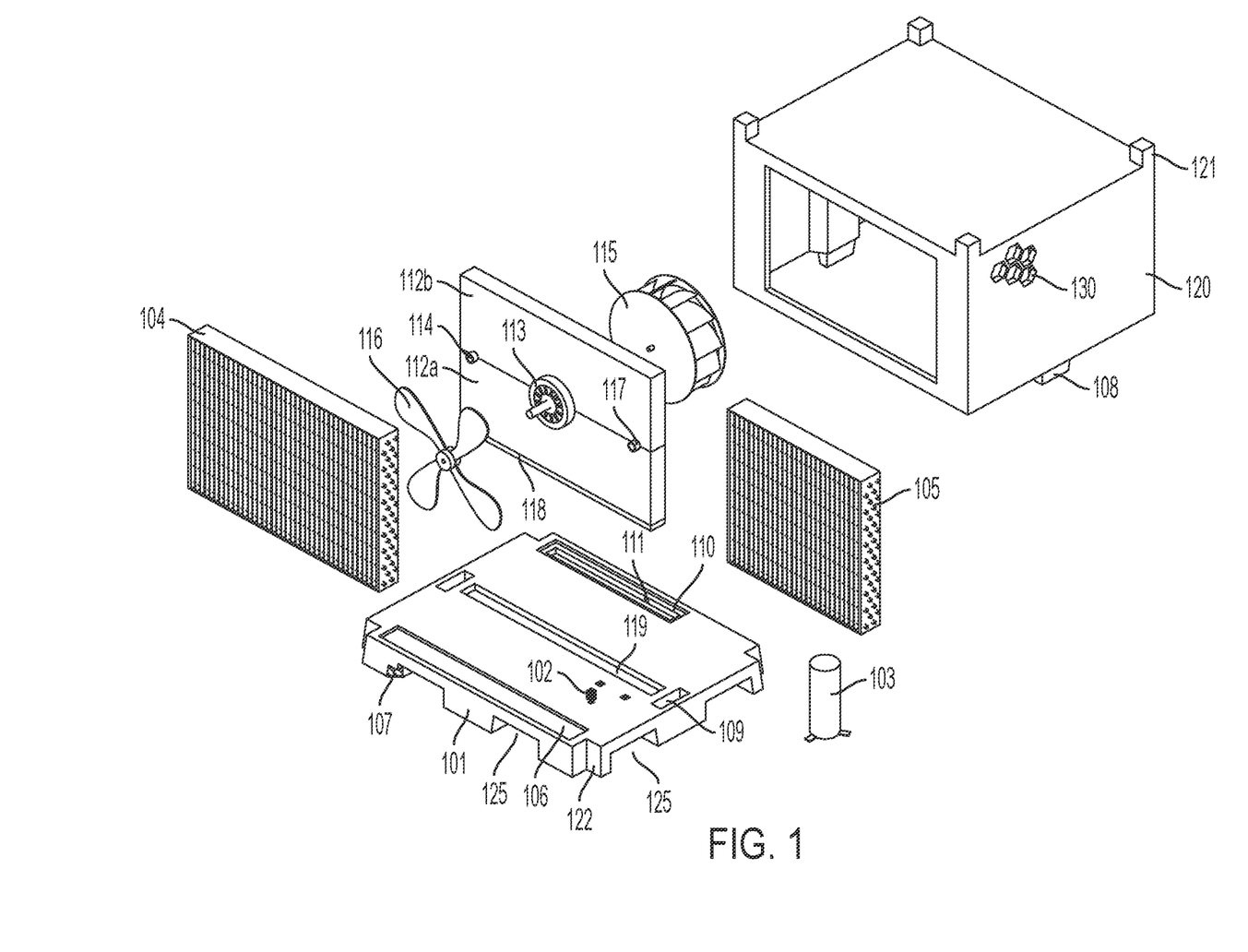
FIG. 1 shows an exploded view of the ECU, showing how the rotomolded parts fit together to form the structure.

Now referring to FIG. 1, which shows a simplified exploded view of the ECU, with only the most common parts shown. It is commonly understood that in addition to the compressor, condenser, evaporator, fans, and blower, there are other necessary or typical components in a vapor compression air conditioner or heat pump, such as the expansion (throttling) device, filter-drier, refrigerant service ports, suction line accumulator, liquid receiver, and reversing valve (if the unit is operating as a heat pump). However, showing only the compressor, condenser, and evaporator, along with the interconnecting plumbing, serves to illustrate the invention, without cluttering the figure with other components. FIG. 1 shows the molded base (101), which has threaded inserts (102) to allow direct bolting of the compressor (103), condenser (104), evaporator (105), and potentially other smaller components (not shown for clarity), where the base has been contoured (106) or recessed to allow a portion of the compressor, condenser, evaporator, and other components to be recessed into the base so as to provide additional structural support and facilitate correct and rapid location of these components during assembly. This molded base is completely filled with an expanding foam, either closed or open cell foam, (107) to provide additional structural rigidity and thermal insulation. Rotomolding, is one means of producing this and the other molded components. Also shown in FIG. 1, are male (108) and/or female (109) features molded into the base and adjoining parts, to simply assembly location, and provide increased structural rigidity at the joint. The condensate drain pan (110) which is used to capture condensate dripping from the evaporator coil, can be integrated directly into the rotomolded base (101), and the condensate drain plumbing (111) which is used to channel the condensate out of the ECU can be routed through the interior of the rotomolded base to an outlet location, as shown (See FIG. 4, 111). Alternatively, a spout (not shown) can be directly molded into the base (101) to allow simple attachment of a drain line at the outlet. Since this ECU can be moved with the assistance of fork lifts or other similar devices, fork lift channels (125) can be also molded into the bottom surface of the base. Since the ECU could also be lifted by cables, lifting eyelets (not shown) can be installed into threaded inserts installed into the male interlocking section (121) on the cover or alternatively could pass thru the cover and be connected to threaded inserts in the base.

Also shown in FIG. 1 is the rotomolded divider, which separates the evaporative and condenser sections of the ECU and is formed in at least two mating parts (112a, 112b) so that components can be sandwiched between the two or more parts of the divider. The molded divider is also filled with closed cell foam so that it provides thermal insulation between the cooler evaporative section and the warmer condenser section. This insulating foam also increases the structural rigidity, reduces vibration, and provides noise dampening characteristics, which is ideal because the divider supports a double-ended motor (113) where the shaft of the motor extends into both the evaporator and condenser sides of the ECU, allowing this single motor to drive both the condenser fan (116) and evaporator blower (115). Since the single condenser fan and blower motor are supported by the divider and all other vapor compression components have been located on, or supported by the base, this means the entire vapor compression fluid circuit has been completely installed and can be connected, without the sides and top of the unit, thereby making assembly, inspection, and performance testing simplified, due to the accessibility to the components. There are at a minimum two plumbing routings (typically condensed liquid refrigerant line and superheat vapor refrigerant line) that must pass between the evaporator and condenser sections of the ECU and these two pipes are likewise supported by and sandwiched between the sections of the divider as shown in FIG. 1 (114, 117).

To provide improved structural strength the divider (112a, 112b) has a tapered male portion (118) which extends into the similarly shaped female section (119) in the base (101). As shown generically in FIG. 5, threaded inserts (502) in one of the mating components align with threaded bolts (504) passing through the other mating component. As these bolts are tightened, they draw the male (501) and female (503) components into a tight interference fit, providing a strong joint.

FIG. 1 also shows the unitary cover (120) that can be preferably molded as a single piece, and optionally filled with foam for added strength and insulation and optionally includes vents (130). The cover is installed into the base, quickly and easily, by providing mating male (108) and female components (109) which align and support the components and threaded inserts (See, e.g., FIG. 5, 502) to complete the installation.

Also shown in FIG. 1, to assist in stacking ECUs for shipment, male (121) and female (122) interlocking sections can be incorporated into the cover (120) and base (101), to allow the ECUs to be interlocked when stacked.

Figure 2:
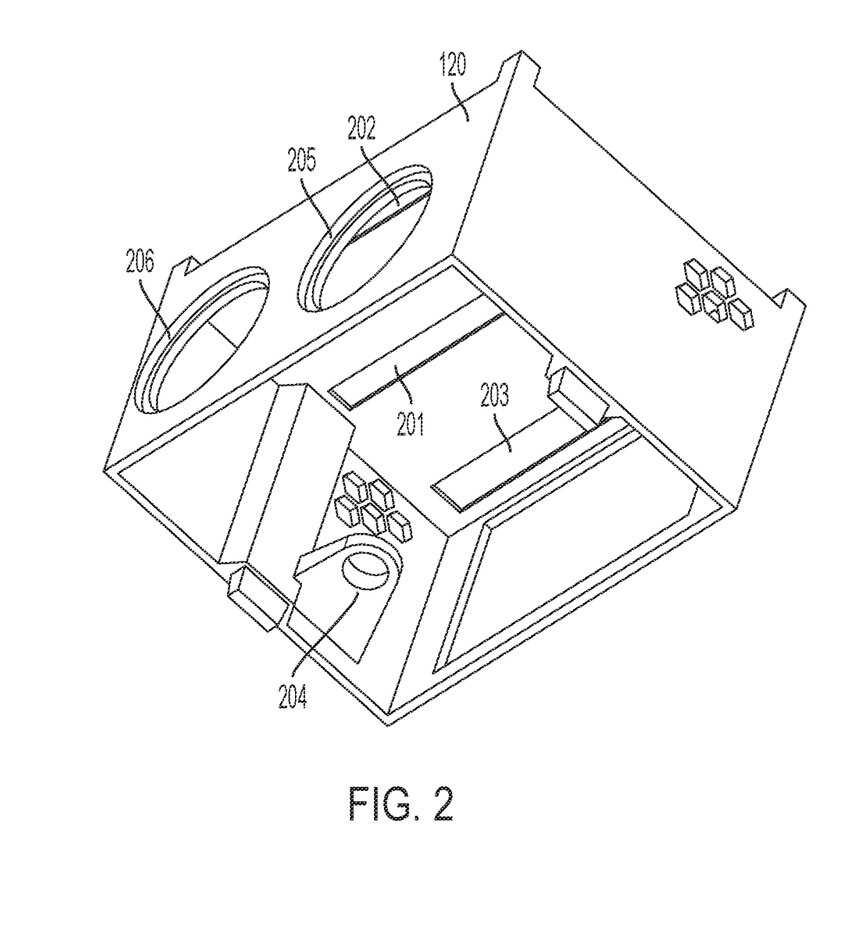
FIG. 2 shows the rotomolded cover, which has recesses or protrusions to accept and support the evaporator coil, condenser coil, compressor, divider, as well as accommodating supply and return ducts.

FIG. 2 shows the underside of the unitary cover (120) that can contain recess (201) to accommodate the divider (112b), as well as recess (202) to accommodate the evaporator coil (105), recess (203) to accommodate the condenser coil (104), a protruding structure (204) to further support the compressor (103) nearer the top of the compressor, and other recesses or features as needed to provide additional structural strength to components once the cover in secured in place. These recesses and other support structures in the cover also simplify locating and alignment of these components.

On conventional ECUs, the flexible air ducts that are connected to the inlet and outlet of the blower assembly are typically removed when not in use and this is a time-consuming and/or awkward operation since the air ducts must be well connected without any leakage paths. As shown in FIG. 2, the unitary cover (120) has two recessed sections to accommodate the storage of the flexible supply duct (205) and return air duct (206) while they stay connected to the inlet and outlet blower connections. Alternatively, a molded flange (not shown) could be incorporated into the cover housing so that the air ducts could be slid over the flange and secured with a band, belt, or hook-and-loop strip.

Figure 3:
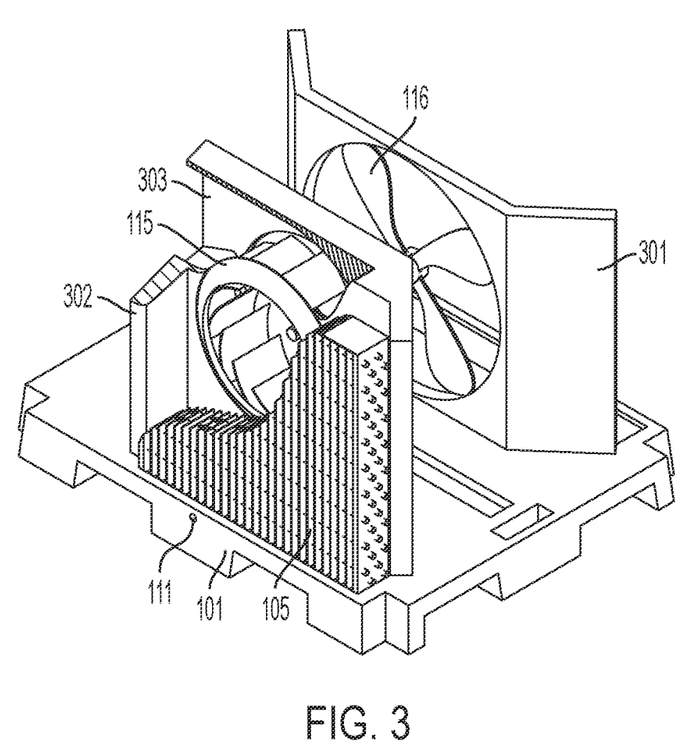
FIG. 3 shows the rotomolded base along with airflow shrouds surrounding the evaporator blower and condenser fan to direct and optimize airflow passageways.

Radial and axial fans typically have some air flow management surfaces to maximize the performance of these devices. As shown in FIG. 3, the condenser fan (116) is surrounded radially by an airflow shroud (301) to improve air flow at the outer perimeter of the fan, and reduce fan edge inefficiencies. In this embodiment, the fan shroud (301) is mounted to the base (101) and also supported by female recesses (see, e.g., FIG. 4, 407) in the base and male protrusions (see, e.g., FIG. 1, 108) in the shroud. Once the shroud is in place it is secured by threaded inserts (see, e.g., FIG. 5, 502) in the shroud and threaded bolts (see, e.g., FIG. 5, 504) passing through the base. As with other components attached to the base, once the cover is secured to the base, recesses (see, e.g., FIG. 1, 109) in the cover further secure the shroud. Similarly, the evaporator blower (115) can be surrounded by an airflow shroud (302) to improve airflow. The evaporator blower shroud can incorporate the same locating recesses (see, e.g., FIG. 4, 406) and securing features found in the condenser fan shroud. Airflow passageways (303) can likewise be molded into the cover and other components to optimize air flow and minimize abrupt changes and sharp turns which tend to increase pressure drop losses.

Figure 4:
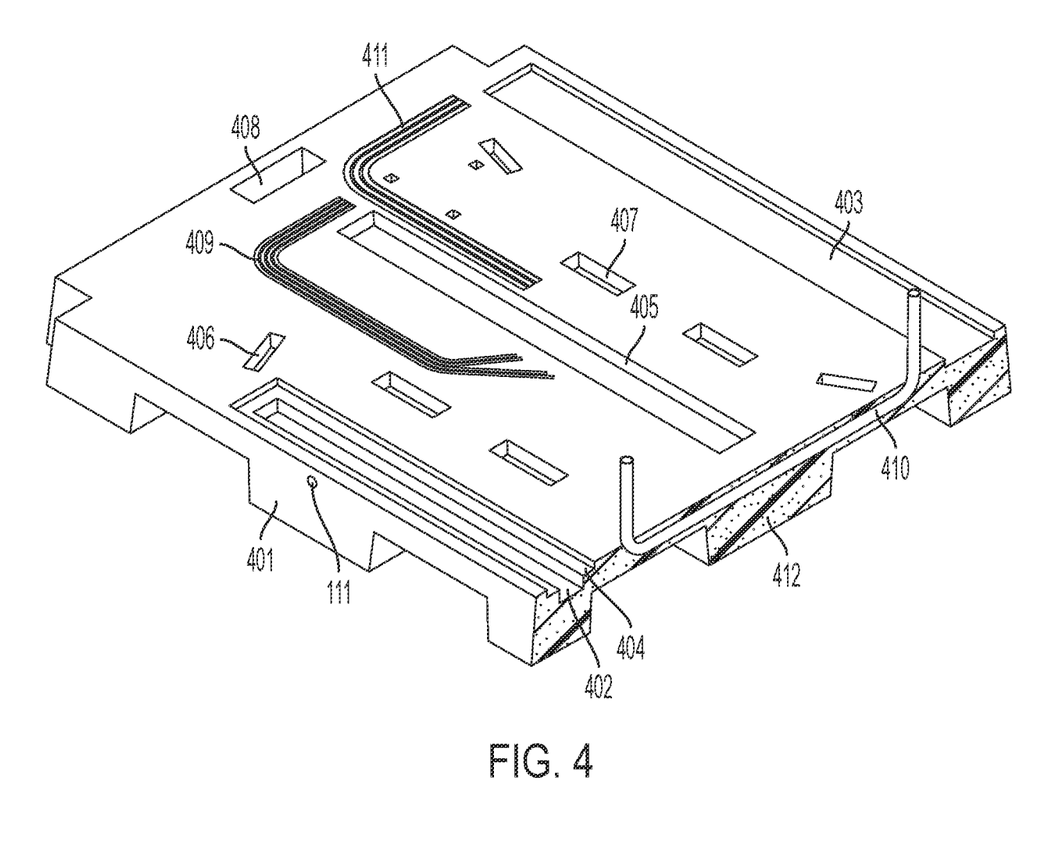
FIG. 4 shows the rotomolded base, which has recesses to form the condensate drain pan, as well as recesses to accept the evaporator and condenser coils. Although not shown in this embodiment, a recess or protrusion to accept the compressor may also be incorporated. This figure also shows the various possible features to locate and secure divider walls, shrouds, cover, plumbing, wiring, and embedded power and sensor signal distribution.

FIG. 4 shows an isometric view of the rotomolded base (401) which has recesses to form the condensate drain pan (402) as well as a recess to accept the condenser (403), a recess to accept the evaporator (404), a recess to accept the divider (405), a recess to accept the evaporator fan shroud (406), recesses to accept the condenser fan shroud (407), and recesses to accept the cover (408). It is to be understood that while a single recess may be shown to accept a particular component, one or more recess could be used to accept and secure a component.

As shown in FIG. 4, the rotomolded surfaces of the base (401) can also have recesses molded into the structure to accommodate wiring (409), and plumbing runs (410). Furthermore, as shown in the base (401) of FIG. 4, electrical current carrying busbars (411) can be located in the interior of the rotomolded structures prior to filling these void spaces with foam insulation (412).

Figure 5:
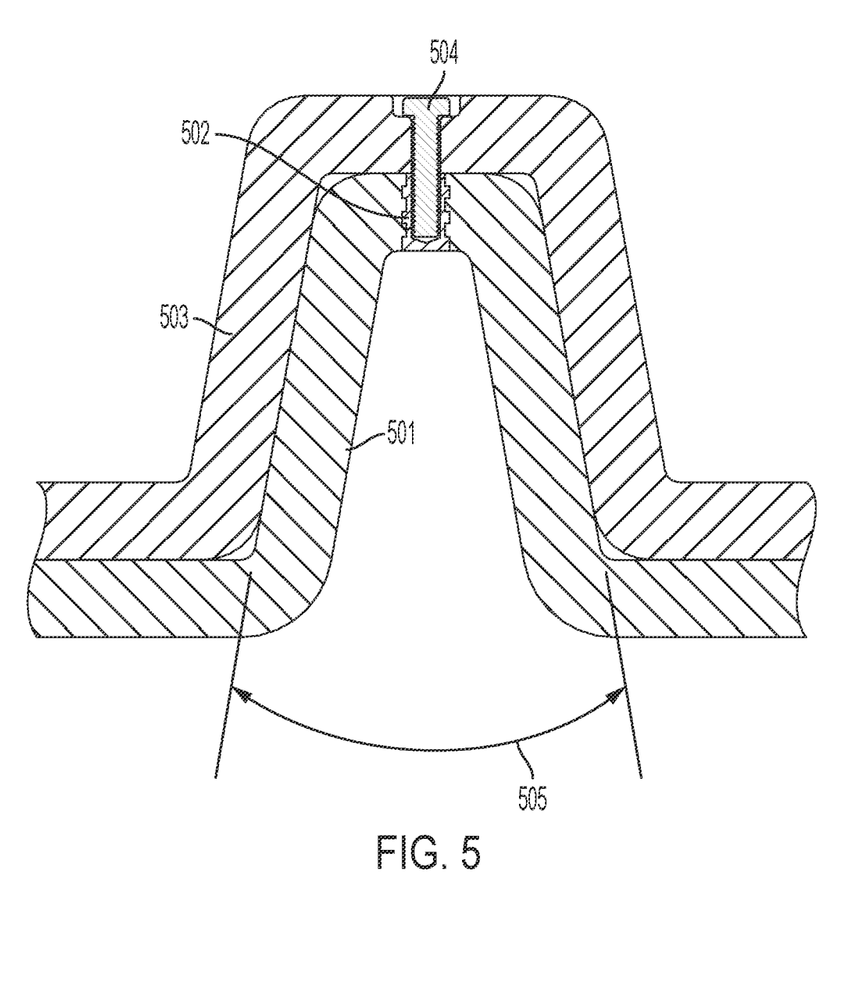
FIG. 5 shows the inference tapered interlocking of rotomolded parts secured with threaded inserts.

FIG. 5 shows an expanded view of the male-female interlocking components found on mating parts were the male protrusion (501) has a threaded insert (502) to tighten and draw the male portion (501) into the tapered female portion (503) by the threading action of the bolt (504) that passes through the female portion. The included angle (505) of the external surfaces of the male portion (501) may be designed to be larger than the included angle of the internal surfaces of the female portion (503) such that there is an interference fit between the parts as the bolt (504) is threaded into the threaded insert (502) and the pieces are drawn into each other, thereby increasing the assembly rigidity. It is also to be understood that while the threaded insert (502) is located in the male part (501) and the threaded bolt (504) passes through the female part (503), the locations could be reversed, so that the threaded insert is located in the female part and the threaded bolt passes through the male part.

Figure 6:
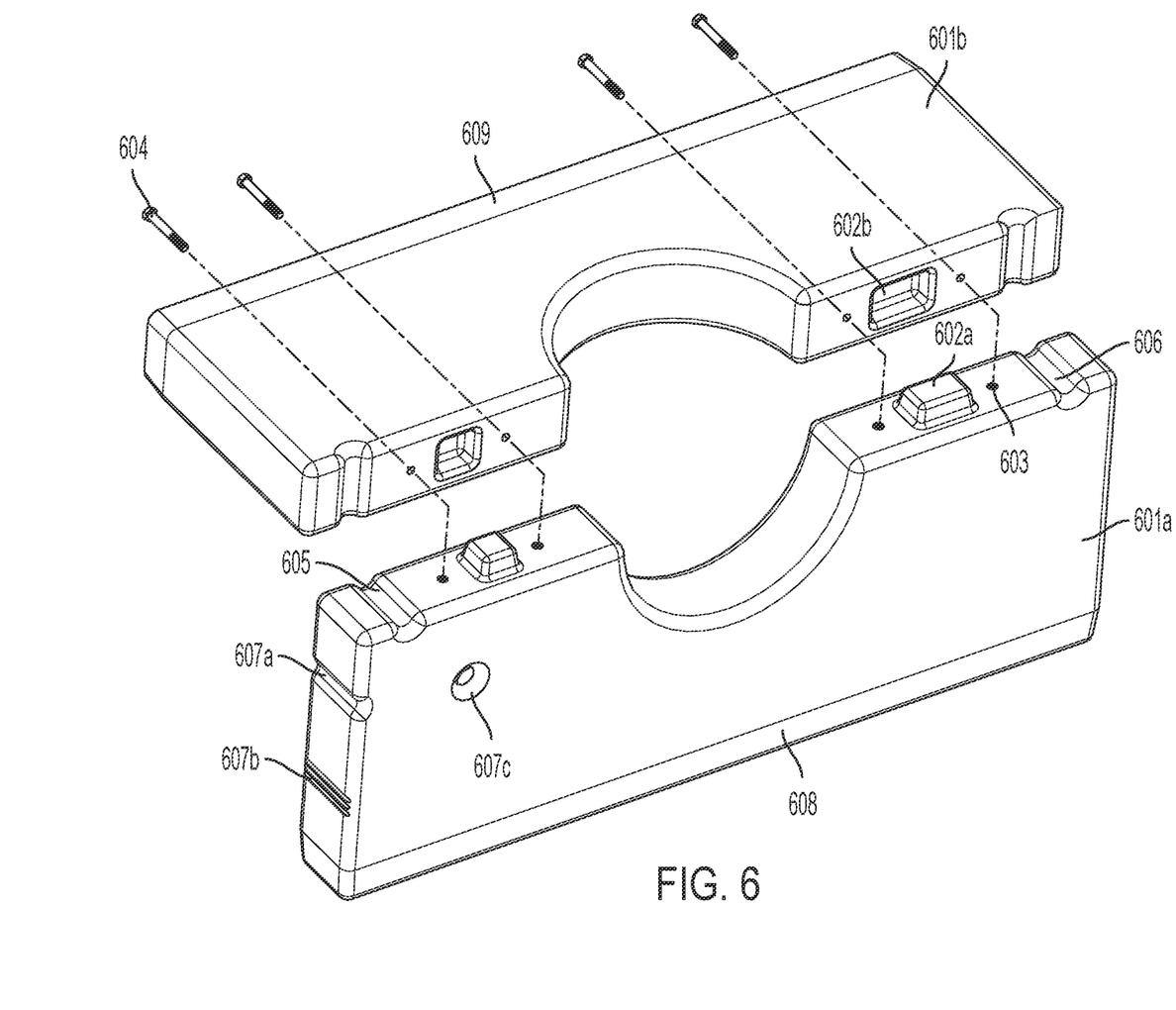
FIG. 6 shows the two-piece center divider which separates the condenser and evaporator sections and supports the single double-shafted fan/blower motor.

FIG. 6 shows an expanded isometric view of the two-pieced center divider (601*a*, 601*b*) to accept the single fan/blower motor, along with male and female tapered portions (602*a*, 602*b*) to align and lock the two halves together with the securing action of the threaded inserts (603) and threaded bolts (604). Passageways (605, 606) to route and support the high pressure condensed refrigerant plumbing line and the lower pressure vapor refrigerant line by the clamping action of the two halves of the divider are also shown, as are various openings (607*a*, 607*b*, 607*c*) for wiring to pass between the halves. Tapered male protrusion (608) is to be aligned and inserted into matching tapered female portion in the base and male protrusion (609) is to be aligned and inserted into matching tapered female portion in the cover, and these tapered bolted protrusions are used to reinforce the divider assembly and stiffen the overall assembly.

Figure 7:
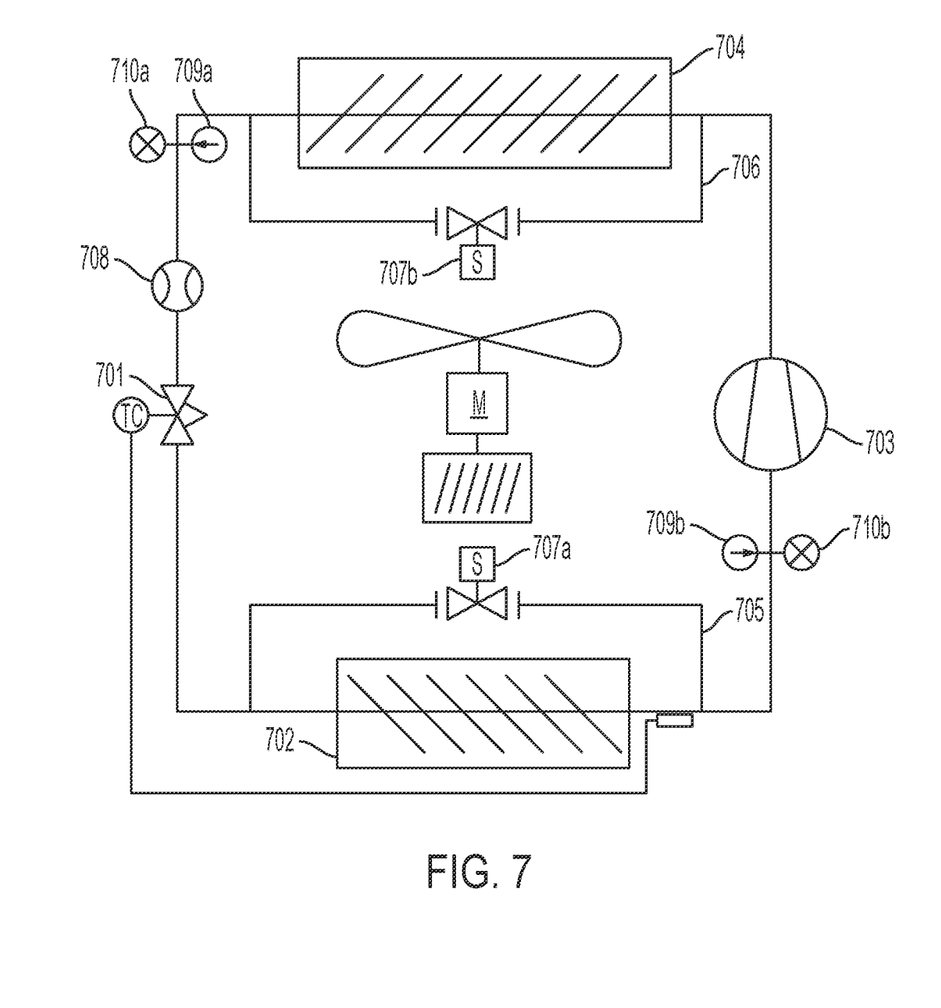
FIG. 7 shows a simplified schematic of the refrigeration circuit, specifically showing the bypass solenoids, which are used to control heat transfer across the coils. Also shown are the flow meter, temperature sensors and pressure transducers which are used for health monitoring and to predict potential operational problems with the unit.

FIG. 7 displays a simplified refrigerant plumbing schematic for the ECU. While the basic vapor compression air conditioning configuration consists of an expansion device (701), evaporator coil (702), compressor (703), and condenser (704), it is common that actual systems typically contain many additional components not shown in FIG. 7, including a filter/drier, suction line accumulator, liquid receiver, service ports, muffler, reversing-valve, high and low pressure cut-off safety switches, and the like. These components have been omitted from FIG. 7 for simplicity, it would be understood when and where to locate such components. What is salient is that FIG. 7 does show some plumbing components to improve the operation of a simplified system, such as the evaporator bypass line (705), condenser bypass line (706), bypass valves (707*a*, 707*b*), refrigerant flow meter (708), and subcooling and superheated refrigerant temperature sensors (709*a*, 709*b*) as well as high and low pressure transducers (710*a*, 710*b*). The ECU also has a compressor current sensor, which is not shown, as well as outdoor ambient and indoor return air temperature sensors (not shown). The refrigerant pressure transducers and temperature sensors (710*a*, 710*b*, 709*a*, 709*b*) along with the refrigerant flow meter (708) are used to determine the cooling capacity of the ECU and this information can be combined with the current sensor (not shown) to determine the Coefficient of Performance in cooling (COPc) of the unit. Furthermore, the COP can be compared with the expected COP, given the measured indoor return air and outdoor air temperatures to indicate any degradation in performance and suggest potential reasons for the degraded performance.

Since a single motor is being used to drive both the evaporator blower and condenser fan, there is naturally some loss in operational flexibility, since in a more traditional configuration, the evaporator fan speed and condenser motor speed could be varied independently to adjust the heat exchange across the evaporator or condenser. That is to reduce the heat transfer, and thereby reduce the energy transfer, the fan or blower speed could be reduced. To accommodate this feature without the luxury of separate variable speed motors to separately control the condenser air flow and the evaporator air flow, solenoid-valve bypass lines are used as shown in FIG. 7. One by-pass line (706) with a valve (707*b*) is located in a parallel flow path with the condenser coil (704), and a second bypass line (705) with a valve (707*a*) is located in a parallel flow path with the evaporator coil (702). In such a configuration, opening the bypass valve would allow some refrigerant to avoid passing through the heat exchanger (which is in the parallel flow arrangement with the open valve), thereby lowering the heat transfer and the energy transported across the heat exchanger. An electrically operated solenoid valve is the currently preferred embodiment of the valve to be used, since a solenoid valve can be repeatedly activated as quickly or a slowly as desired, thereby providing any desired heat transfer reduction; that is, any quantity of refrigerant bypassing the heat exchanger, can be easily adjusted by altering the time the solenoid is operated ranging from essentially complete heat exchanger bypass when the solenoid is opened for extremely long periods to no bypass if the solenoid valve is not opened. It should be noted that a solenoid valve in each parallel flow path or a bi-directional valve or a diverter valve could be used to bypass the refrigerant flow around the heat exchanger, however, since the pressure drop of the bypass line is far less than the pressure drop through the heat exchanger, only a single bypass solenoid is needed, since when opened the far lower pressure drop will assure that a majority of the refrigerant will flow through the open bypass.

Having described the unique elements of this invention, we will describe how this invention is used. The ECU is located outdoors in reasonably close proximity to the shelter to be conditioned. The conditioned air supply ductwork attached to the ECU is attached to an air distribution plenum or ductwork to distribute conditioned air into the shelter. A second ductwork, the return air ductwork, provides a means for air from the shelter to be returned to the ECU for conditioning. The condensate drain line, which receives condensation off the evaporator coil is routed from the ECU to a convenient location outside of the shelter. In alternate embodiments, this condensate may be returned to the condenser heat exchanger coil face to saturate the air, thereby cooling the incoming air to the wet bulb temperature and increasing condenser heat transfer or the condensate could be directed to the surface of the condenser coil to evaporate from this surface and increase condenser heat rejection.

The previously described versions of the present invention have many advantages including health monitoring, improved ruggedness, reduced manufacturing cost, simplified maintenance, reduced noise, reduced vibration and reduced weight.

While we have shown and described several embodiments in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

What is claimed is:

1. A greater than 24,000 BTU/hr vapor compression environmental control assembly consisting of:
- a compressor, a condenser, an evaporator, a fan, a blower, a single motor for the fan and blower, an expansion valve, a filter-drier, refrigerant service ports, a suction line accumulator, a liquid receiver, a reversing valve for operating the unit in a heat pump mode, a diffuser to house the blower, and a fan shroud to house the fan, wherein the compressor, the condenser, and the evaporator are connected together by a high pressure condensed refrigerant plumbing line and a lower pressure vapor refrigerating line;
- a molded base having a first plurality of molded recesses therein to position at least the compressor, the condenser, the evaporator, and a molded divider into the molded base;
- the molded divider separates the evaporative and condenser sections of the assembly and supports the single fan/blower;
- a molded cover having a second plurality of molded recesses therein, in alignment with the first plurality of recesses, to position at least the compressor, the condenser, and evaporator, and the divider into the cover;
- wherein the molded base, molded divider, and molded cover are filled with a foam substance to provide at least one or more of structural rigidity, reduced vibration, and reduced noise; and
- wherein at least one of plumbing, wiring, or electrical busses are routed through the molded divider.

* * * * *